(12) United States Patent
Nishita

(10) Patent No.: US 10,708,572 B2
(45) Date of Patent: Jul. 7, 2020

(54) PHOTOGRAMMETRIC SYSTEM AND PHOTOGRAMMETRIC METHOD

(71) Applicant: TOPCON CORPORATION, Itabashi-ku, Tokyo (JP)

(72) Inventor: Nobuyuki Nishita, Tokyo (JP)

(73) Assignee: TOPCON CORPORATION, Itabashi-ku, Tokyo (JP)

(*) Notice: Subject to any disclaimer, the term of this patent is extended or adjusted under 35 U.S.C. 154(b) by 0 days.

(21) Appl. No.: 16/109,896

(22) Filed: Aug. 23, 2018

(65) Prior Publication Data

US 2019/0068952 A1 Feb. 28, 2019

(30) Foreign Application Priority Data

Aug. 28, 2017 (JP) ................. 2017-163023

(51) Int. Cl.
| | |
|---|---|
| *G06T 7/73* | (2017.01) |
| *H04N 13/221* | (2018.01) |
| *H04N 5/235* | (2006.01) |
| *G01C 11/02* | (2006.01) |
| *G01C 11/06* | (2006.01) |
| *B64C 39/02* | (2006.01) |

(52) U.S. Cl.
CPC .......... *H04N 13/221* (2018.05); *G01C 11/02* (2013.01); *G01C 11/06* (2013.01); *G06T 7/73* (2017.01); *B64C 39/024* (2013.01); *B64C 2201/127* (2013.01); *G06T 2207/10012* (2013.01); *G06T 2207/30244* (2013.01); *H04N 5/2353* (2013.01)

(58) Field of Classification Search
CPC ................ H04N 13/221; G06T 7/73
USPC .................................. 348/50, 144
See application file for complete search history.

(56) References Cited

U.S. PATENT DOCUMENTS

| | | | | |
|---|---|---|---|---|
| 6,086,268 | A * | 7/2000 | DiRisio ............... | G03B 9/68 396/452 |
| 9,007,461 | B2 * | 4/2015 | Ohtomo .............. | G05D 1/0094 348/144 |
| 9,013,576 | B2 * | 4/2015 | Ohtomo ............... | G01C 11/02 348/142 |
| 2008/0094482 | A1 * | 4/2008 | Yoshimura .......... | H04N 5/232 348/222.1 |
| 2011/0001846 | A1 * | 1/2011 | Yoshimura .......... | H04N 5/232 348/230.1 |

(Continued)

FOREIGN PATENT DOCUMENTS

JP 2013108927 A 6/2013

*Primary Examiner* — Christopher S Kelley
*Assistant Examiner* — Asmamaw G Tarko
(74) *Attorney, Agent, or Firm* — Chisea Shahinian & Giantomasi PC

(57) ABSTRACT

A photogrammetric system includes a camera installed in a movable body and including a shutter unit that moves an exposed portion across an imaging surface from one side to the other side for exposure to capture an image, a measuring device configured to measure a position at which the camera captures the image, and a photogrammetry data generator configured to extract a feature point from the image captured by the camera, calculate a feature point capture position at which the feature point is captured based on a measurement result of the measuring device and a moving time of the exposed portion, and generate photogrammetry data including the feature point capture position.

6 Claims, 5 Drawing Sheets

(56) References Cited

U.S. PATENT DOCUMENTS

| | | | | |
|---|---|---|---|---|
| 2012/0300070 A1* | 11/2012 | Ohtomo | ................. | G01C 11/02 |
| | | | | 348/144 |
| 2012/0320203 A1* | 12/2012 | Liu | ....................... | G01C 11/04 |
| | | | | 348/144 |
| 2013/0135440 A1* | 5/2013 | Ohtomo | ............... | G03B 15/006 |
| | | | | 348/46 |
| 2014/0146173 A1* | 5/2014 | Joyce | ..................... | G01C 11/04 |
| | | | | 348/144 |
| 2014/0240498 A1* | 8/2014 | Ohtomo | ................. | B64D 47/08 |
| | | | | 348/144 |
| 2014/0371952 A1* | 12/2014 | Ohtomo | ............... | B64C 39/024 |
| | | | | 701/2 |
| 2015/0220085 A1* | 8/2015 | Ohtomo | .............. | G08G 5/0069 |
| | | | | 701/2 |

* cited by examiner

PHOTOGRAMMETRIC SYSTEM AND PHOTOGRAMMETRIC METHOD

CROSS-REFERENCE TO RELATED APPLICATION

This application claims priority to Japanese Patent Application No. 2017-163023 filed on Aug. 28, 2017, the entire disclosure of which is incorporated by reference herein.

BACKGROUND

The present disclosure relates to a photogrammetric system and a photogrammetric method for generating a stereo model from images captured by a camera installed in a movable body.

Photogrammetry surveying techniques are known in which an image capture device such as a camera sequentially captures an object while moving relative to the object and the position of the device and the position of the object are measured from the captured images. Recent techniques use, for example, unmanned aerial vehicles (UAVs) as movable bodies. The UAVs are equipped with cameras and capture images from up in the sky.

Such a photogrammetry surveying technique is used to generate a stereo model based on feature points extracted from a plurality of captured images. Examples of the feature points include points characteristic of structures and landforms on the ground such as buildings, rivers, and mountaintops, and ground control points used as orientation points.

Conventional techniques are disclosed in, for example, Japanese Unexamined Patent Publication No. 2013-108927. In this disclosure, a flying object flies in meandering manner up in the sky over an object range to be measured and captures images of the object range. The flying object periodically captures images such that adjacent images in the advancing direction and adjacent images in adjacent courses overlap each other to a certain degree. After the flying object finishes capturing the entire object range, a single stereo image is prepared by relative orientation on one set of images adjacent to each other with regard to three images adjacent to each other in the advancing direction, and another stereo image is prepared by relative orientation on the other set of adjacent images. The two sets of stereo images are connected by using feature points extracted from a portion common to the two sets of stereo images, the portion being an overlapped portion of the three images. Subsequently, common tie points are selected from the images adjacent to each other in the adjacent courses and the adjacent stereo images in the adjacent courses are connected. With this process, a unified stereo image (stereo model) is prepared that covers the entire object range that has been measured and is represented by common three-dimensional coordinate system.

Conventional photogrammetry surveying techniques, such as Japanese Unexamined Patent Publication No. 2013-108927, typically use digital single-lens cameras that are commercially widely available. Such digital single-lens cameras typically include a focal-plane shutter that is a type of photographic shutter.

In the conventional photogrammetry surveying techniques, photogrammetric calculations are performed based on feature points on the assumption that all the objects in an image captured at a certain point of an area are captured simultaneously.

When an image is captured by using focal-plane shutter, portions of the imaging surface are exposed at slightly different timing in accordance with the travel time of the shutter curtains (light-excluding curtains). Exposure at different timing causes an image captured from a fast moving object such as a UAV to include errors (distortions) with regard to a relation between the positions in the images and the actual positions on the ground.

Such a problem occurs not only when physical shutter (mechanical shutter) such as focal-plane shutter is used, but also when electronic rolling shutter that linearly and sequentially exposes an imaging device from one side to the other side is used.

Since feature points include positional errors, performing feature-point-based photogrammetric calculations on the assumption that all the objects in an image are captured simultaneously results in reduction in accuracy in generating stereo model, which in turn reduces accuracy in photogrammetry.

SUMMARY

Embodiments of the present disclosure have been made to solve the problems described above, and it is an object of the present disclosure to provide a photogrammetric system and a photogrammetric method that can eliminate errors in feature points in an image and improve accuracy in photogrammetry using a camera that captures images by moving an exposed portion across an imaging surface.

To achieve the object above, the photogrammetric system according to an embodiment of the present disclosure includes a camera, a capture position measuring unit, and a photogrammetry data generator. The camera is installed in a movable body and includes a shutter unit that unidirectionally moves an exposed portion across an imaging surface from one side to the other side thereof. The camera is configured to capture an image by causing the shutter unit to expose the imaging surface from the one side to the other side. The capture position measuring unit is configured to measure a capture position at which the camera captures the image. The photogrammetry data generator is configured to extract a feature point from the image captured by the camera, calculate a feature point capture position at which the feature point is captured based on the capture position measured by the capture position measuring unit and a moving time where the exposed portion is moved by the shutter unit, and generate photogrammetry data including the feature point capture position.

To achieve the object above, the photogrammetric method according to an embodiment of the present disclosure includes a capturing step, a capture position measuring step, and a photogrammetry data generating step. In the capturing step, an image is captured by a camera installed in a movable body and including a shutter unit that unidirectionally moves an exposed portion across an imaging surface from one side to the other side thereof. The image is captured such that the camera causes the shutter unit to expose the imaging surface from the one side to the other side. In the capture position measuring step, a capture position is measured at which the image is captured in the capturing step. In the photogrammetry data generating step, a feature point is extracted from the image captured in the capturing step, a feature point capture position at which the feature point is captured is calculated based on the capture position measured by the capture position measuring step and a moving time where the exposed portion is moved by the shutter unit, and photogrammetry data including the feature point capture position is generated.

The photogrammetric system and the photogrammetric method according to an embodiment of the present disclosure can eliminate errors in feature points in an image and enhances accuracy in photogrammetry using a camera designed to capture images by moving an exposed portion across an imaging surface.

DETAILED DESCRIPTION

An embodiment of the present disclosure will be described with reference to the accompanying drawings.

Figure 1:
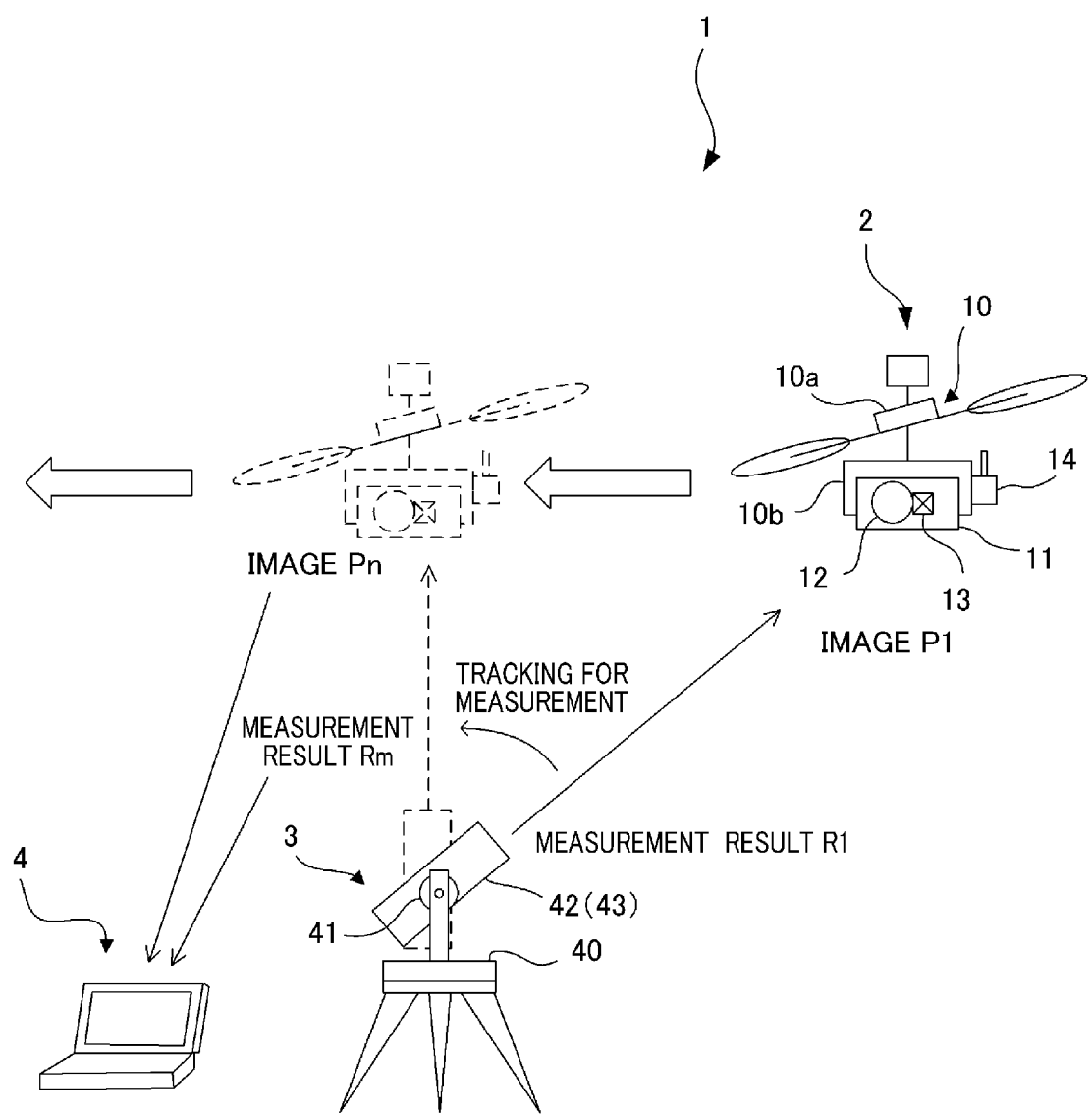
FIG. 1 is a diagram illustrating a general configuration of a photogrammetric system according to an embodiment of the present disclosure.
Figure 2:
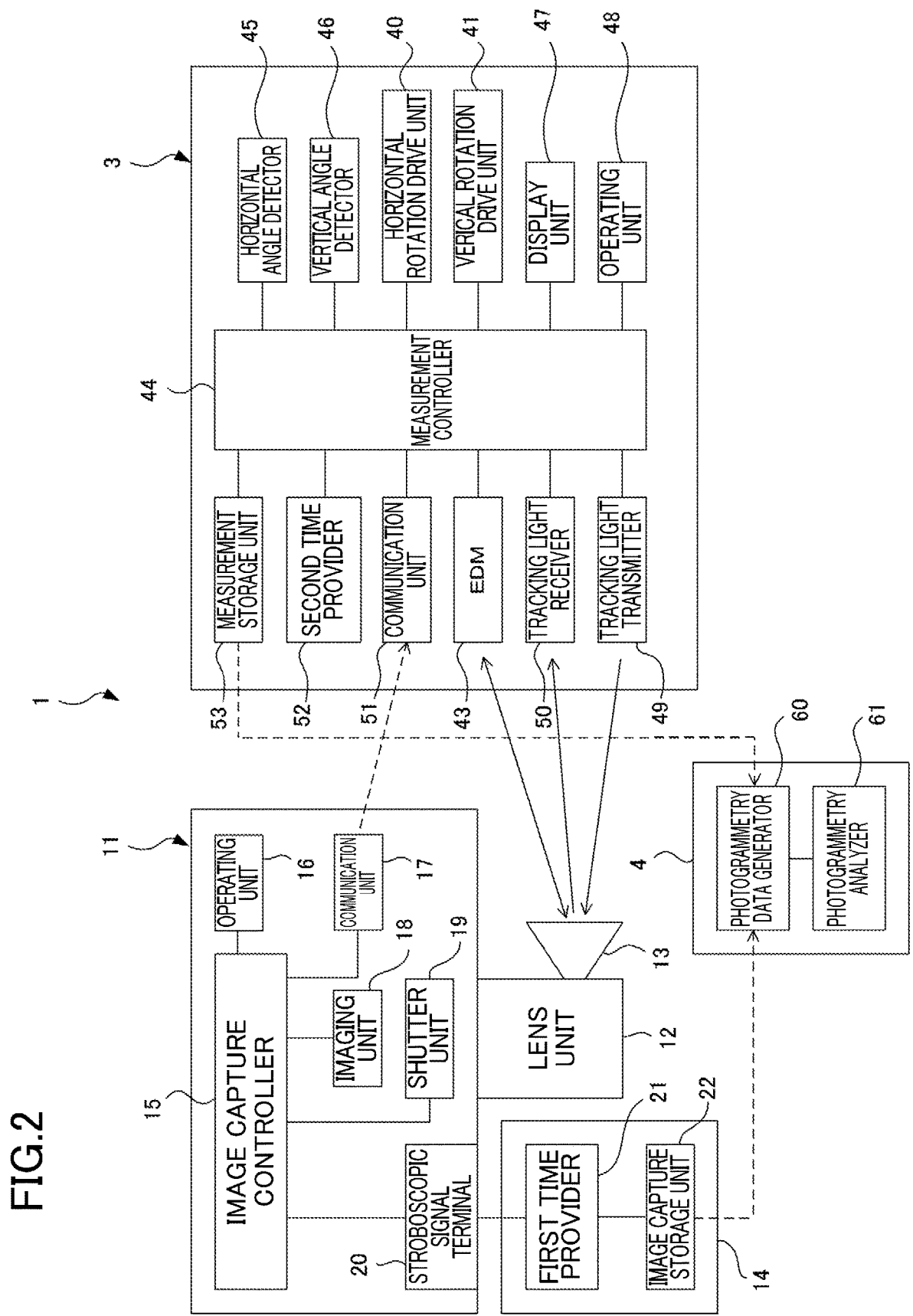
FIG. 2 is a block diagram of a control system of the photogrammetric system according to the embodiment of the present disclosure.
Figure 3:
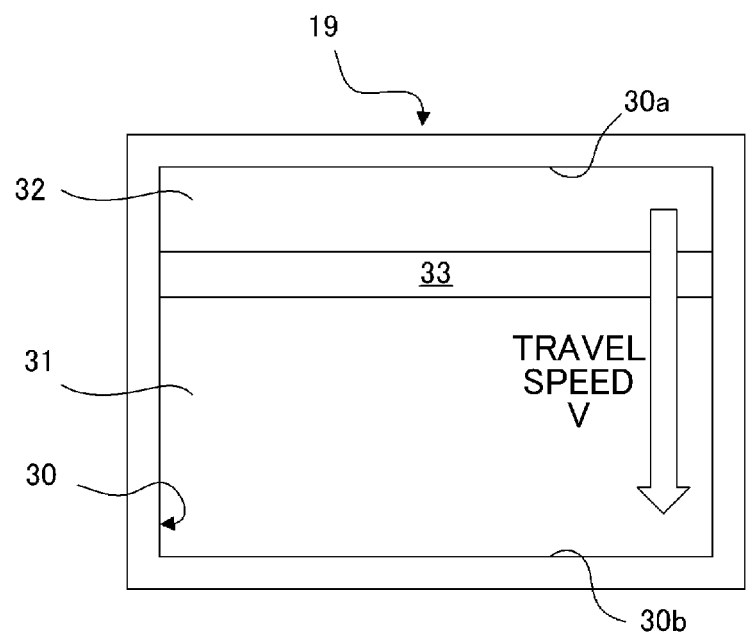
FIG. 3 is a diagram illustrating a schematic configuration of a shutter unit.

FIG. 1 is a diagram illustrating a general configuration of a photogrammetric system according to the embodiment of the present disclosure. FIG. 2 is a block diagram of a control system of the photogrammetric system. FIG. 3 is a diagram illustrating a schematic configuration of a shutter unit. The following describes the general configuration and the control system of the photogrammetric system according to the embodiment of the present disclosure with reference to FIGS. 1 to 3.

This photogrammetric system 1 includes a movable image-capture device 2 configured to capture a plurality of images for use in photogrammetry while moving, a measuring device 3 (capture position measuring unit) configured to measure the position of the movable image-capture device 2, and an analyzer device 4 configured to analyze capture results and measurement results to generate data (photogrammetry data) for use in photogrammetry and generate, for example, a stereo model.

The movable image-capture device 2 is configured by a UAV 10 as a movable body and a camera 11 installed in the UAV 10 to capture images for use in photogrammetry. The camera 11 may capture still images or moving images.

Specifically, the UAV 10 is a flying movable body that can fly in accordance with a predetermined flight path or fly in any flight path in accordance with remote control. The UAV 10 includes a flying mechanism 10a for flight and a gimbal mechanism 10b provided below the flying mechanism 10a.

The camera 11 is supported by the gimbal mechanism 10b of the UAV 10. The gimbal mechanism 10b allows the camera 11 to capture images in any direction and can stabilize the orientation of the camera 11 so that the camera 11 can capture images in a certain direction.

The camera 11 includes a lens unit 12 in the front of the main body and a prism 13 adjacent to the front end of the lens unit 12. The camera 11 includes a global positioning system (GPS) unit 14 that can receive a GPS signal.

The measuring device 3 is a total station that can automatically track an object to be measured. The measuring device 3 includes a horizontal rotation drive unit 40 that is horizontally rotatable, a vertical rotation drive unit 41 that is vertically rotatable, and a telescope unit 42 disposed above the horizontal rotation drive unit 40 via the vertical rotation drive unit 41. The telescope unit 42 includes an electro-optical distance meter (EDM) 43 for measuring a slope distance to a target.

Specifically, the measuring device 3 is designed to measure the prism 13 as a measurement target. The measuring device 3 can measure the distance and horizontal and vertical angles from the measuring device 3 to the prism 13. The measuring device 3 is placed on a known position and leveled, and then measures the slope distance, horizontal angle, and vertical angle to the prism 13. From these measurement results, coordinates of the prism 13, namely the position of the camera 11, can be calculated.

The analyzer device 4 is an information processing terminal such as a personal computer that can generate data for use in photogrammetry by associating the measurement results obtained by the measuring device 3 with capture positions of the images captured by the movable image-capture device 2.

In the photogrammetric system 1, as illustrated in FIG. 1, the movable image-capture device 2 captures a plurality of images P1, P2, to Pn for use in photogrammetry from above while moving in the sky at a certain capture period ΔS, and the measuring device 3 tracks the movable image-capture device 2 (specifically, the prism 13 mounted to the camera 11) for measurement. The analyzer device 4 associates the images P1, P2, to Pn captured by the movable image-capture device 2 with measurement results R1, R2, to Rm obtained by the measuring device 3. The analyzer device 4 extracts feature points from the images P1, P2, to Pn and calculates a capture position (feature point capture position) for each feature point, and then generates photogrammetry data including the feature point capture positions. The analyzer device 4 then generates, for example, a stereo model using the photogrammetry data.

Described next is a configuration of a control system configured by computers installed in the camera 11, the measuring device 3, and the analyzer device 4 of the photogrammetric system 1 with reference to FIG. 2.

As illustrated in FIG. 2, the camera 11 includes an image capture controller 15 in addition to the lens unit 12, the prism 13, and the GPS unit 14. The image capture controller 15 is electrically connected to an operating unit 16, a communication unit 17, an imaging unit 18, a shutter unit 19, and a stroboscopic signal terminal 20. The image capture controller 15 may be connected to, for example, a storage unit, a display unit, and sensors, which are not illustrated, in addition to those units above. At least captured images are stored in an internal or external storage unit.

The operating unit 16 is used to input operating instructions and settings to the image capture controller 15. Examples of the operating instructions include instructions for switching on or off of power, a trigger for starting image capture operation, switching of capture modes, setting on capture period, setting on image quality, and instructions for switching on or off of connection to the measuring device 3. The operating unit 16 may include a certain operating device or input device such as a switch, button, or dial.

The communication unit 17 is communicable with external devices, and is, for example, a wireless communication unit using a standard such as Bluetooth (registered trademark). The communication unit 17 may include a wired communication unit that communicates via a connection terminal. In the same manner, the communication unit to be described below may include a wired communication unit.

The imaging unit 18 converts optical images on the exposed imaging surface of an imaging device such as a charge-coupled device (CCD) or a complementary metal-oxide semiconductor (CMOS) into an electric signal.

The shutter unit 19 is a focal-plane shutter disposed immediately in front of the imaging unit 18 and close to the lens unit 12. As specifically illustrated in FIG. 3, the shutter unit 19 includes a shutter frame 30 defining a rectangular aperture and shutter curtains including a first curtain 31 and a second curtain 32 that are movable in a short direction of the shutter frame 30. In capturing an image, as indicated by an arrow outline in FIG. 3, the first curtain 31 and the second curtain 32 both travel in the short direction. The first curtain 31 and the second curtain 32 are spaced apart from each other while traveling across the shutter frame 30 and this gap configures an exposure aperture 33 that is a linearly extending slit in the longitudinal direction of the shutter frame 30. The width of the gap between the first curtain 31 and the second curtain 32, or the width of the exposure aperture 33 can vary in accordance with exposure time.

In other words, the exposure aperture 33 moves in the short direction in capturing an image and light passing through the exposure aperture 33 forms an exposed portion on the imaging surface of the imaging unit 18. For example, the exposure aperture 33 according to the present embodiment, or the exposed portion on the imaging surface, moves across the shutter frame 30 from a long side 30*a* to another long side 30*b* in a moving time M (e.g., 2 ms).

The image capture controller 15 can control the shutter unit 19 to capture images at a preset capture period ΔS and can transmit shutter signals (capture start signals) or captured images to external devices via the stroboscopic signal terminal 20.

The GPS unit 14 is connected to the camera 11 via the stroboscopic signal terminal 20. The GPS unit 14 includes a first time provider 21 and an image capture storage unit 22.

The first time provider 21 includes a clock that receives a GPS signal including time information from a GPS satellite, and generates GPS time based on the GPS signal and pulse-per-second (PPS) signals that are cyclic pulses. The first time provider 21 has a function of providing first time Tc (GPS time) relating to capture timings to an image P captured by the camera 11 in response to the shutter signal transmitted via the stroboscopic signal terminal 20, and outputting the image P with the first time Tc to the image capture storage unit 22. The GPS time is, for example, absolute time based on coordinated universal time (UTC).

The image capture storage unit 22 can store therein image data including an image P captured by the camera 11 and the first time Tc provided by the first time provider 21.

The measuring device 3 includes, in addition to the horizontal rotation drive unit 40, the vertical rotation drive unit 41, and the EDM 43 that are connected to the measurement controller 44, a horizontal angle detector 45, a vertical angle detector 46, a display unit 47, an operating unit 48, a tracking light transmitter 49, a tracking light receiver 50, a communication unit 51, a second time provider 52, and a measurement storage unit 53 that are also connected to the measurement controller 44.

The horizontal angle detector 45 detects a horizontal rotation angle of the horizontal rotation drive unit 40, which can detect a horizontal angle at which the telescope unit 42 is collimated. The vertical angle detector 46 detects a vertical rotation angle of the vertical rotation drive unit 41, which can detect a vertical angle at which the telescope unit 42 is collimated. The horizontal angle detector 45 and the vertical angle detector 46 detect a horizontal angle and a vertical angle as a measurement result.

The display unit 47 is, for example, a liquid crystal display monitor and can display various kinds of information such as the measurement result (slope distance, horizontal angle, vertical angle).

The operating unit 48 is used to input operating instructions and settings to the measurement controller 44. Examples of the operating instructions include instructions for switching on or off of power, a trigger for starting measurement operation, switching of measurement modes, and setting on a measurement period. The operating unit 48 may include a certain operating device or input device such as a switch, button, or dial in the same manner as the operating unit 16 of the camera 11.

The tracking light transmitter 49 emits tracking light and the tracking light receiver 50 receives the tracking light reflected from the prism 13. The measurement controller 44 controls the horizontal rotation drive unit 40 and the vertical rotation drive unit 41 such that the tracking light receiver 50 will not miss the tracking light emitted from the tracking light transmitter 49, thereby achieving the function of tracking a target.

The communication unit 51 is communicable with external devices in the same manner as the communication unit 17 of the camera 11, and is, for example, a wireless communication unit using a standard such as Bluetooth (registered trademark).

The second time provider 52 includes, in the same manner as the first time provider 21, a clock that receives a GPS signal including time information from a GPS satellite and generates GPS time based on the GPS signal and PPS signals that are cyclic pulses. The second time provider 52 has a function of providing second time Tt (GPS time) relating to measurement timings to a measurement result R in response to measurement, and outputting the measurement result R with the second time Tt to the measurement storage unit 53.

The measurement storage unit 53 can store therein computer programs relating to measurement such as a computer program for the tracking function described above and a computer program for measurement performed at a certain measurement period, and various kinds of data such as measurement data including the second time Tt provided to a measurement result R by the second time provider 52.

Once tracking of the prism 13 is established, the measurement controller 44 starts the measurement operation at a certain measurement period ΔT. The measurement controller 44 causes the measurement storage unit 53 to store therein the measurement data including a measurement result R and the second time Tt provided to the measurement result R by the second time provider 52.

The analyzer device 4 includes a photogrammetry data generator 60 and a photogrammetry analyzer 61.

The photogrammetry data generator 60 can be connected to the movable image-capture device 2 and the measuring device 3 in a wired or wireless manner. The photogrammetry data generator 60 acquires image data stored in the image capture storage unit 22 of the movable image-capture device 2 and the measurement data stored in the measurement storage unit 53 of the measuring device 3, and associates them based on the first time Tc and the second time Tt. The image data includes images P1, P2 to Pn and first times Tc1, Tc2, to Tcn that are attached to the images P1, P2, to Pn, respectively. The measurement data includes measurement results R1, R2, to Rm and second times Tt1, Tt2, to Ttm that are attached to the measurement results R1, R2, to Rm, respectively.

The photogrammetry data generator 60 extracts a plurality of feature points F from each of the images P1, P2, to Pn of the image data, and calculates a feature point capture position Rf at which each feature point F is captured based on the measurement results R1, R2, to Rm and the moving time M of the exposed portion. The photogrammetry data generator 60 then generates photogrammetry data including the feature point capture positions Rf.

Specifically, the photogrammetry data generator 60 according to the present embodiment calculates an offset time ΔO from a relation between the position of each feature point F in an image and the moving time M of the exposed portion. The offset time ΔO is a time period from when the camera 11 starts capturing an image to when a portion of a specific feature point F is exposed. The photogrammetry data generator 60 then adds the offset time ΔO of the feature point F to first time corresponding to the image capture start time to obtain feature point capture time, and calculates a capture position corresponding to the feature point capture time as a feature point capture position.

The photogrammetry analyzer 61 generates a stereo model based on the photogrammetry data generated by the photogrammetry data generator 60. The photogrammetry analyzer 61 can generate a three-dimensional or two-dimensional topographical map by matching the stereo model with the actual landforms and determining the scale and spatial positions (compass directions and coordinates).

Figure 4:
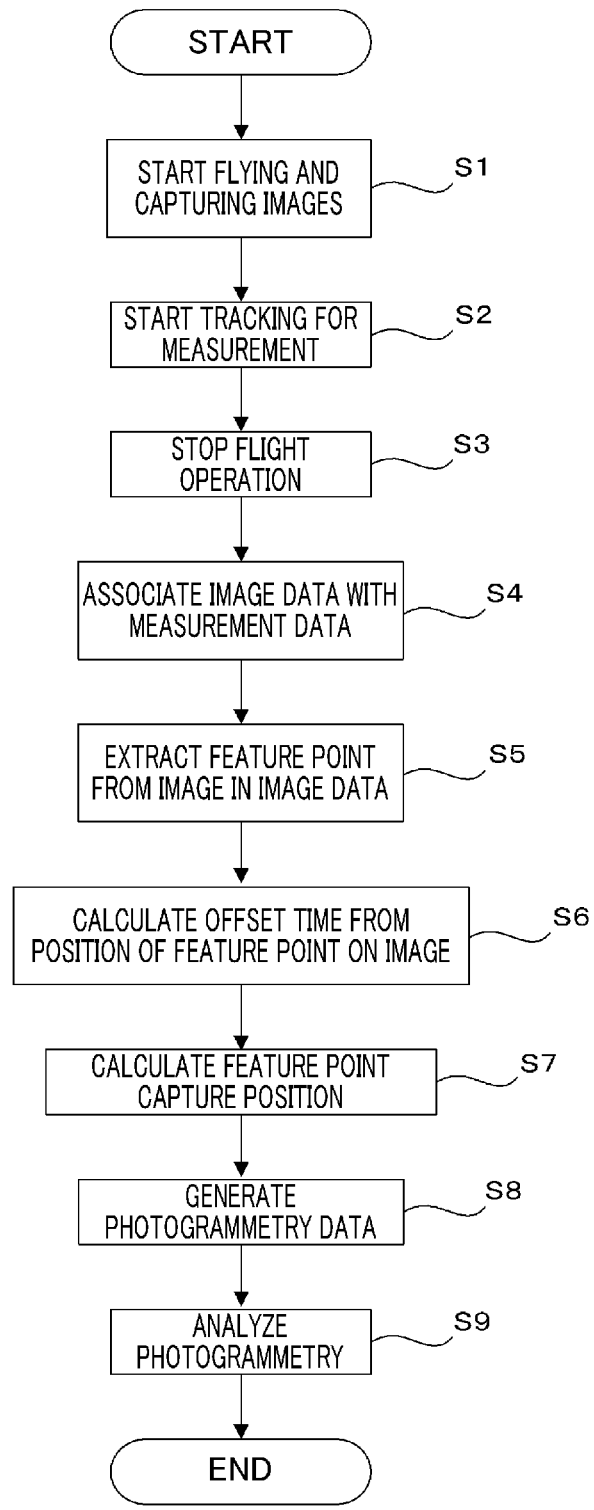
FIG. 4 is a flowchart of a photogrammetric routine according to the embodiment of the present disclosure.
Figure 5:
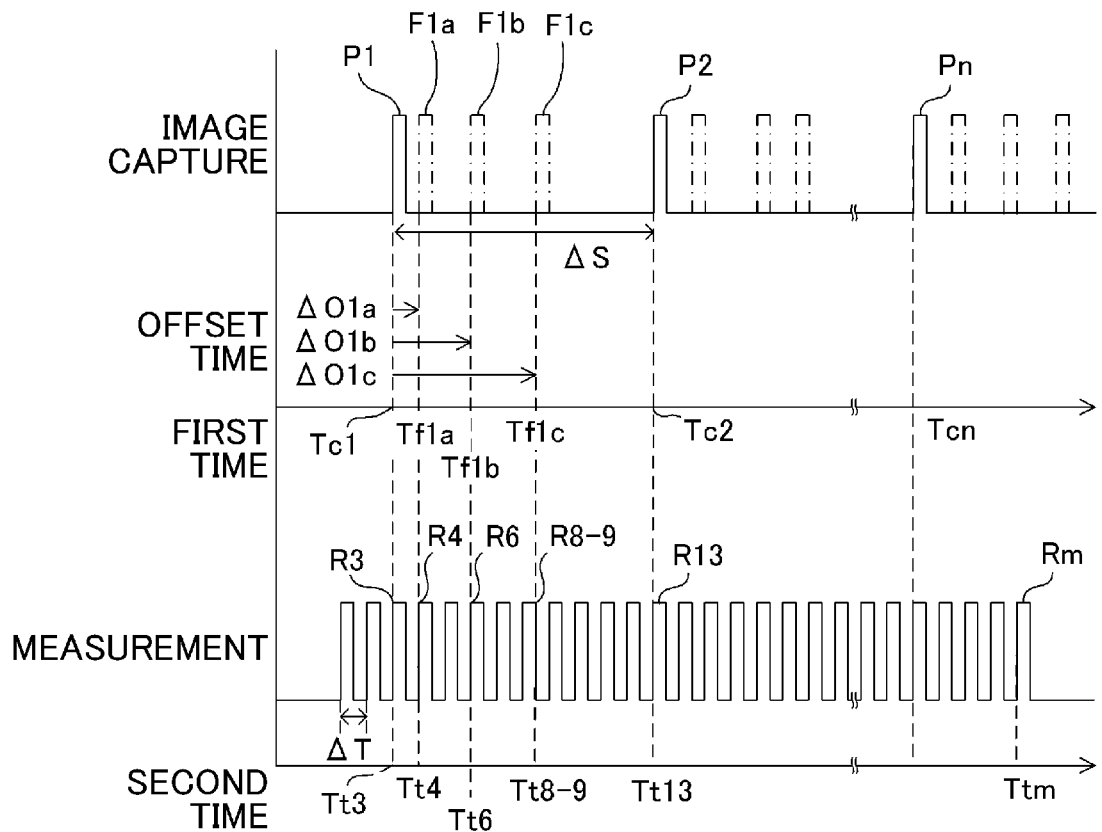
FIG. 5 is a time chart relating to image capture and measurement operations of the photogrammetric system according to the embodiment of the present disclosure.
Figure 6:
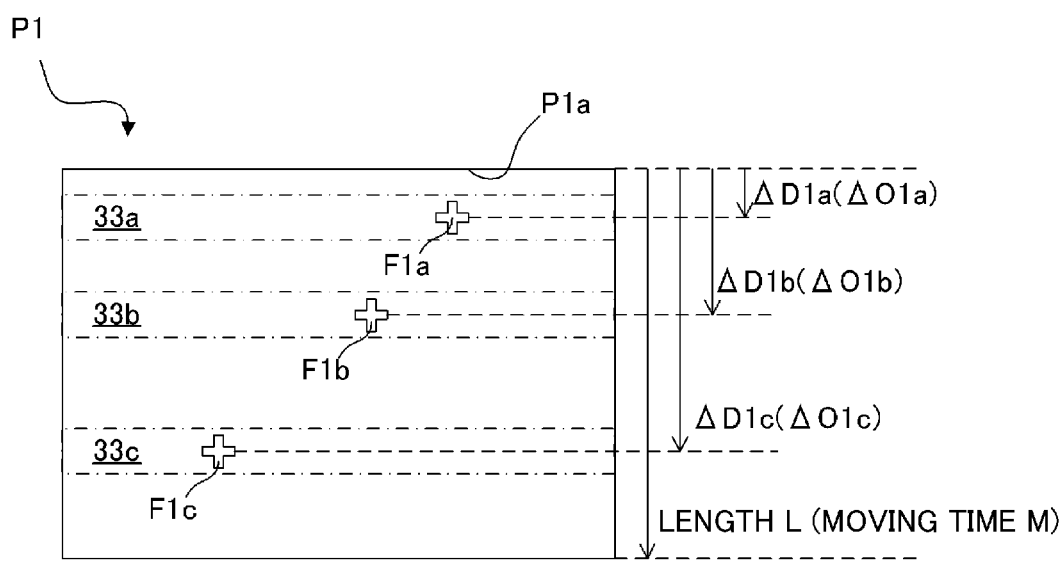
FIG. 6 is a diagram illustrating example feature points on an image.

The following description refers to FIGS. 4 to 6. FIG. 4 is a flowchart of a photogrammetric routine of the photogrammetric system according to the present embodiment, FIG. 5 is a time chart relating to capture timings of feature points, and FIG. 6 is a diagram illustrating example feature points on an image. The photogrammetric method according to the present embodiment will be described with reference to the flowchart in FIG. 4, and to FIGS. 5 and 6, as appropriate.

Before starting the photogrammetric routine illustrated in FIG. 4, the movable image-capture device 2 is set to fly above the target range of the photogrammetry in the sky in a meandering manner in accordance with a flight plan and capture images by the camera 11 at a certain capture period.

At Step S1 of the photogrammetric routine, the movable image-capture device 2 starts flying and starts capturing photographic images by the camera 11 (capturing step). Specifically, the movable image-capture device 2 captures an image by the camera 11 a plurality of times (n times) at a certain capture period ΔS while flying in accordance with the flight plan. When the camera 11 captures an image P, the first time provider 21 of the GPS unit 14 provides, upon reception of a shutter signal, the first time Tc corresponding to the capture time of the image P to the image P, and the image P with the first time Tc is stored in the image capture storage unit 22. As illustrated in the time chart in FIG. 5, for example, the first captured image P1 is provided with the first time Tc1, the second captured image P2 is provided with the first time Tc2, and the image Pn captured in the nth time is provided with the first time Tcn. In other words, the first time Tc corresponds to the image capture start time of each image P.

At Step S2, the measuring device 3 starts tracking the flying movable image-capture device 2 for measurement (capture position measuring step). Specifically, the measuring device 3 measures the position of the camera 11 at a certain measurement period ΔT while tracking the movable image-capture device 2. The measurement period ΔT is shorter than the capture period ΔS, that is, corresponding to a higher frequency pulse. The measuring device 3 performs measurement at, for example, a measurement period ΔT of 20 to 100 ms whereas an image is captured at a capture period ΔS of 1 to 3 s. For ease of discussion, the measurement period ΔT in FIG. 5 has one tenth the length of the capture period ΔS.

Upon measurement by the measuring device 3, the measurement result R (slope direction, horizontal angle, vertical angle) is provided with second time Tt corresponding to the measurement time and is stored in the measurement storage unit 53.

In FIG. 5, for example, a measurement result R3 that corresponds to the third time measurement since the beginning of tracking is provided with second time Tt3, the 13th measurement result R13 is provided with second time Tt13, and the mth time measurement result Rm is provided with second time Ttm.

At Step S3, the movable image-capture device 2 ends the flying operation after finishing the image capture operation determined by the flight plan.

Subsequently, at Step S4, the photogrammetry data generator 60 acquires a plurality of pieces of image data stored in the image capture storage unit 22, each piece of image data including an image P and the corresponding first time Tc, and a plurality of pieces of measurement data stored in the measurement storage unit 53, each piece of measurement data including a measurement result R and the corresponding second time Tt, and associates the image data with the measurement data. Specifically, the photogrammetry data generator 60 extracts a measurement result R having the second time Tt that matches the first time Tc attached to an image P, and associates the extracted measurement result R with the image P as a capture position.

In FIG. 5, for example, since the first time Tc1 corresponding to the first image P1 matches the second time Tt3 corresponding to the measurement result R3, the photogrammetry data generator 60 associates the measurement result R3 with the image P1 as a capture position of the image P1.

If the first time Tc and the second time Tt do not match, the photogrammetry data generator 60 may determine second times Tta and Ttb immediately before and after the first time Tc to be applicable second times, and calculate an interpolated measurement result Ri obtained by interpolation between measurement results Ra and Rb corresponding to the second times Tta and Ttb, and then associate the interpolated measurement result Ri with the image P.

Subsequently, at Step S5, the photogrammetry data generator 60 extracts a plurality of feature points F from the image P of each piece of image data (photogrammetry data generating step).

At Step S6, the photogrammetry data generator 60 calculates, from the position of each feature point on the image, the offset time ΔO from the image capture start time (photogrammetry data generating step).

Specifically, as illustrated in FIG. 6, if three feature points F1a, F1b, and F1c are extracted from the first image P1, the photogrammetry data generator 60 calculates offset distances ΔD1a, ΔD1b, and ΔD1c from a long side P1a of the image P1 corresponding to the long side 30a of the shutter frame 30 to the respective feature points F1a, F1b, and F1c as positions of the feature points on the image.

The photogrammetry data generator 60 then calculates offset times ΔO1a, ΔO1b, and ΔO1c corresponding to the offset distances ΔD1a, ΔD1b, and ΔD1c, respectively, based on the moving time M of the exposure aperture 33 corresponding to the moving time of the exposed portion and a length L of the short side of the image P1. An offset time ΔO is calculated from an expression ΔO=ΔD*M/L. In other words, the offset times ΔO1a, ΔO1b, and ΔO1c are time periods from when the exposure aperture 33 indicated by alternate long and short dash line in FIG. 6 starts moving from the long side P1a of the image P1 corresponding to the image capture start time to when the exposure aperture 33 passes the respective positions corresponding to the feature points F1a, F1b, and F1c.

At Step S7, the photogrammetry data generator 60 calculates feature point capture positions Rf (photogrammetry data generating step). Specifically, the photogrammetry data generator 60 adds an offset time ΔO to the image capture start time (first time) Tc of an image P to calculate feature point capture time Tf, and then calculates a capture position R corresponding to the feature point capture time Tf as a feature point capture position Rf.

In FIG. 5, for example, the offset time ΔO1a, ΔO1b, and ΔO1c of the feature points F1a, F1b, and F1c are added to the capture time Tc1 of the first image P1 to calculate feature point capture times Tf1a, Tf1b, and Tf1c.

The photogrammetry data generator 60 extracts measurement results R having second times Tt that match the feature point capture times Tf1a, Tf1b, and Tf1c. In FIG. 5, the photogrammetry data generator 60 calculates a measurement result R4 acquired at second time Tt4 corresponding to the first feature point F1a as a feature point capture position Rf1a of the first feature point F1a. The photogrammetry data generator 60 calculates a measurement result R6 acquired at second time Tt6 corresponding to the second feature point F1b as a feature point capture position Rf1b of the second feature point F1b.

In the same manner as in the method of matching a measurement result R with the capture position of an image P, if the feature point capture time Tf does not match the second time Tt, the photogrammetry data generator 60 may determine second times Tta and Ttb immediately before and after the feature point capture time Tf to be applicable second times, and calculate an interpolated measurement result Ri obtained by interpolation between measurement results Ra and Rb corresponding to the second time Tta and Ttb, and then associate the interpolated measurement result Ri with the feature point. In FIG. 5, for example, the third feature point capture time Tf1c (=Tc1+ΔO1c) in the first image P1 corresponds to middle of time between second time Tt8 and second time Tt9. The photogrammetry data generator 60 calculates an interpolated measurement result R8-9 as a feature point capture position Rf1c.

Subsequently at Step S8, the photogrammetry data generator 60 generates photogrammetry data including the feature point capture positions calculated for the respective feature points (photogrammetry data generating step).

At Step S9, the photogrammetry analyzer 61 performs photogrammetry analysis such as generating a stereo model based on the photogrammetry data, and then the routine is ended.

In the photogrammetric system 1 and the photogrammetric method according to the embodiment above, capture positions of respective feature points in an image, namely feature point capture positions, are calculated in addition to the capture position of the image. This configuration allows the photogrammetric system including the camera 11 having a focal-plane shutter that captures an image by moving an exposed portion across an imaging surface to eliminate errors in feature points. The photogrammetric system can generate photogrammetry data based on such error-free feature points, thereby enhancing accuracy in photogrammetry.

Specifically, an offset time ΔO corresponding to a time period from when the camera starts capturing an image P to when a portion of a feature point F is exposed is calculated from a relation between the position of the feature point F in the image P and a moving time M where an exposed portion is moved by the shutter unit 19. The calculated offset time is added to the image capture start time to calculate feature point capture time Tf, and a capture position corresponding to the feature point capture time Tf is calculated as a feature point capture position Rf. With this process, an accurate feature point capture position Rf can be calculated.

Applying the photogrammetric system 1 and the photogrammetric method according to the embodiment above to photogrammetry using the camera 11 that captures an image P by moving an exposed portion across an imaging surface can eliminate errors in feature points F in the image P, thereby enhancing accuracy in photogrammetry.

Although a preferred embodiment of the present disclosure has been described above, the present disclosure is not limited to the embodiment above.

In the embodiment above, for example, the shutter unit 19 of the camera 11 is a focal-plane shutter, but the camera 11 may include a rolling shutter having no physical shutter curtains and designed to capture images by electrically moving an exposed portion across an imaging surface. The photogrammetric system according to the embodiment above can include such a camera and has the same effect as described in the embodiment above.

In the embodiment above, the movable image-capture device 2 and the measuring device 3 both acquire GPS time, and a captured image P and a measurement result R are associated based on the GPS time to calculate a capture position of the image, but the method of calculating a capture position of an image is not limited to this. For example, the movable image-capture device and the measuring device may include timers having the same accuracy, and the image and the measurement result may be associated based on synchronization of the timers.

In the embodiment above, the measuring device 3 placed on the ground measures capture positions of the movable image-capture device 2, but the capture positions of the images may be measured using, for example, positional information acquired from a global navigation satellite system (GNSS) such as GPS installed in the movable image-capture device 2.

In the embodiment above, the movable image-capture device 2 includes the UAV 10 as a movable body, but the movable body is not limited to this. The movable body may be, for example, a manned aerial vehicle or a movable body that moves on the ground.

What is claimed is:
1. A photogrammetric system comprising:
   a camera installed in a movable body, the camera including a shutter unit that unidirectionally moves an exposed portion on an imaging surface across a shutter frame from a long side to another long side, the camera being configured to capture an image by causing the shutter unit to expose the imaging surface from the long side to the other long side;
   a first time provider having a function of providing first time relating to capture timings to the image captured by the camera;

a capture position measuring unit configured to measure a capture position at which the camera captures the image;

a second time provider having a function of providing second time relating to measurement timings to a measurement result in response to measurement by the capture position measuring unit; and a photogrammetry data generator configured to associate the image captured by the camera and the capture position measured by the capture position measuring unit based on the first time and the second time, extract a feature point from the image, calculate an offset time that is a time period from when the camera starts capturing the image to when a portion of the feature point is exposed, from a relation between a position of the feature point in the image and the moving time where the exposed portion is moved by the shutter unit, and calculate a capture position corresponding to a feature point capture time as the feature point capture position, the feature point capture time being obtained by adding the offset time to the first time corresponding to image capture start time, and generate data for use in photogrammetry, the data including the feature point capture position.

2. The photogrammetric system of claim 1, wherein the shutter unit is a focal-plane shutter.

3. The photogrammetric system of claim 1, wherein the shutter unit is a rolling shutter.

4. The photogrammetric system of claim 1, wherein the capture position measuring unit is a measuring device configured to track the camera and measure a position of the camera.

5. The photogrammetric system of claim 1, wherein the capture position measuring unit is a global navigation satellite system (GNSS) installed in the movable body.

6. A photogrammetric method comprising:

capturing an image by a camera installed in a movable body, the camera including a shutter unit that unidirectionally moves an exposed portion on an imaging surface across a shutter frame from a long side to another long side, the camera being configured to cause the shutter unit to expose the imaging surface from the long side to the other long side to capture the image;

providing first time relating to capture timings to the image captured in the capturing;

measuring a capture position at which the image is captured in the capturing;

providing second time relating to measurement timings to a measurement result in response to the measuring the capture position; and generating data for use in photogrammetry, the data including a feature point capture position, by associating the image captured in the capturing and the capture position measured in the measuring based on the first time and the second time, extracting a feature point from the image captured in the capturing, calculating an offset time that is a time period from when the camera starts capturing the image to when a portion of the feature point is exposed, from a relation between a position of the feature point in the image and the moving time where the exposed portion is moved by the shutter unit, and calculating a capture position corresponding to a feature point capture time as the feature point capture position, the feature point capture time being obtained by adding the offset time to the first time corresponding to image capture start time.

* * * * *